(12) United States Patent
Ficara et al.

(10) Patent No.: US 11,627,464 B2
(45) Date of Patent: Apr. 11, 2023

(54) GROUPING USERS BY PRE-SHARED KEY (PSK) IN HOSPITALITY

(71) Applicant: Cisco Technology, Inc., San Jose, CA (US)

(72) Inventors: Domenico Ficara, Essertines-sur-Yverdon (CH); Ugo Mario Campiglio, Morges (CH); Amine Choukir, Lausanne (CH); Sachin Dinkar Wakudkar, St-Sulpice (CH); Javier Ignacio Contreras Albesa, Sant Cugat del Valles (ES); Jerome Henry, Pittsboro, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/090,169

(22) Filed: Nov. 5, 2020

(65) Prior Publication Data

US 2021/0360400 A1  Nov. 18, 2021

Related U.S. Application Data

(60) Provisional application No. 63/024,671, filed on May 14, 2020.

(51) Int. Cl.
*H04W 12/069* (2021.01)
*H04W 12/086* (2021.01)
(Continued)

(52) U.S. Cl.
CPC ..... *H04W 12/069* (2021.01); *H04W 12/0433* (2021.01); *H04W 12/63* (2021.01); *H04W 84/12* (2013.01)

(58) Field of Classification Search
CPC .............. H04W 12/069; H04W 12/63; H04W 12/0433; H04W 84/12; H04W 12/086
See application file for complete search history.

(56) References Cited

U.S. PATENT DOCUMENTS 9,769,655 B2  9/2017  Sheu
10,305,862 B2  5/2019  Bone
(Continued)

OTHER PUBLICATIONS

Vernon Shure, "Secure Wi-Fi Access Using Dynamic Pre-Shared Keys", CommScope, Mar. 6, 2018, 7 pages.
(Continued)

*Primary Examiner* — Jinsong Hu
*Assistant Examiner* — Farideh Madani
(74) *Attorney, Agent, or Firm* — Edell, Shapiro & Finnan, LLC

(57) ABSTRACT

Presented herein are techniques to manage a wireless local area network. A method includes defining a plurality of geographical zones corresponding to a geographical area that is serviced by a common service set identifier for a wireless local area network, assigning a pre-shared key to a mobile station based on the plurality of geographical zones, wherein the pre-shared key is associated with predetermined policies for a user of the mobile station, associating a media access control address of the mobile station with the pre-shared key, and controlling access of the mobile station to the wireless local area network based on the predetermined policies.

20 Claims, 14 Drawing Sheets

(51) Int. Cl.
*H04W 12/63* (2021.01)
*H04W 12/0433* (2021.01)
*H04W 84/12* (2009.01)

(56) References Cited

U.S. PATENT DOCUMENTS

| | | | |
|---|---|---|---|
| 2012/0216239 A1* | 8/2012 | Yadav | H04L 63/0236 |
| | | | 726/1 |
| 2017/0070881 A1* | 3/2017 | Sun | H04L 63/06 |
| 2017/0118633 A1 | 4/2017 | Walker et al. | |
| 2017/0374548 A1* | 12/2017 | Mason | H04W 12/041 |
| 2018/0092011 A1* | 3/2018 | Lin | H04W 36/0016 |
| 2020/0396604 A1* | 12/2020 | Olshansky | H04W 12/069 |

OTHER PUBLICATIONS

"Ruckus Networks," Commscope, https://www.ruckuswireless.com/content/dynamic-pre-shared-key-dpsk, retrieved Aug. 11, 2022, 9 pages.

"Working with Dynamic Pre-Shared Keys," Commscope, RUCKUS ZoneDirector 10.5 User Guide, https://docs.commscope.com/bundle/zd-10.5-userguide/page/GUID-A218D05D-4BFA-49D7-84A7-A9640FD0C52B.html, Last updated: Jul. 29, 2019, 2 pages.

* cited by examiner

Authentication frame body

| Order | Information | Notes |
|---|---|---|
| 7 | Fast Bss Transition | An FTE is present only in certain Authentication frames as defined in Table 9-36. |
| 8 | Timeout Interval (reassociation deadline) | A TIE containing the reassociation deadline interval is present only in certain Authentication frames as defined in Table 9-36. |
| 9 | RIC | A resource information container, containing a variable number of elements, is present only in certain Authentication frames as defined in Table 9-36. |
| 10 | Finite Cyclic Group | An unsigned integer indicating a finite cyclic group as described in 12.4.4. This is present only in certain Authentication frames as defined in Table 9-36. |
| 11 | Anti-Clogging Token | A random bit string used for anti-clogging purposes as described in 12.4.6 This is present only in certain Authentication frames as defined in Table 9-36. |
| 12 | Send-Confirm | A binary encoding of an integer used for anti-replay purposes as described in 12.4.7.5. This is present only in certain Authentication frames as defined in Table 9-36. |
| 13 | Scaler | An unsigned integer encoded as described in 12.4.7.4. This is present only in certain Authentication frames as defined in Table 9-36. |
| 14 | Finite field element | A Finite field element field from a finite field encoded as described in 12.4.7.4. This is present only in certain Authentication frames as defined in Table 9-36. |
| 15 | Confirm | An unsigned integer encoded as described in 12.4.7.5. This is present only in certain Authentication frames as defined in Table 9-36. |
| 16 | Multi-band | The Multi-band element is optionally present if dot11MultibandImplemented is true. |
| 17 | Neighbor Report | One or more Neighbor Report elements are present only in certain Authentication frames as described in Table 9-36. |
| Last | Vendor Specific | One or more vendor-specific elements are optionally present. These elements follow all other elements. |

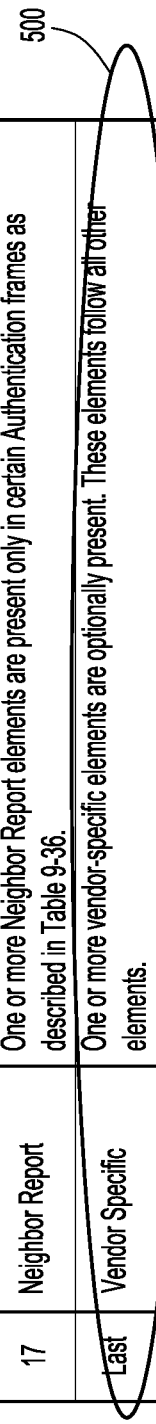

FIG.5

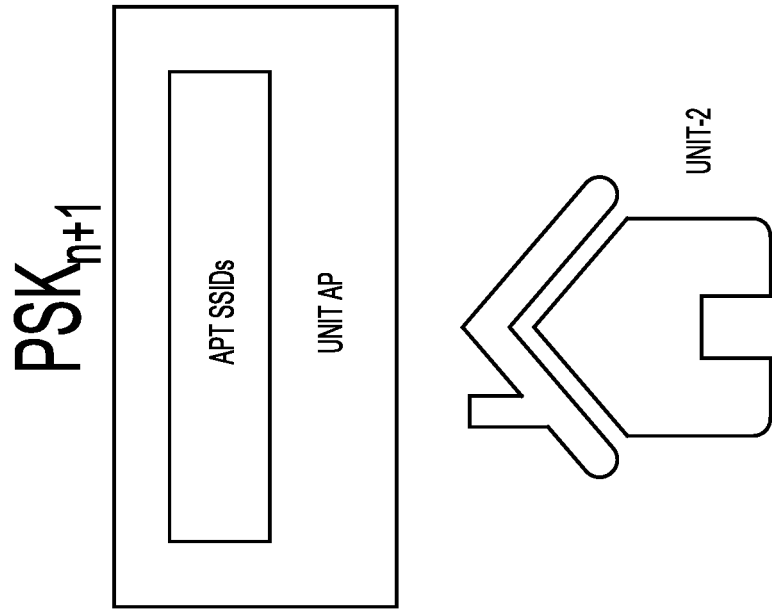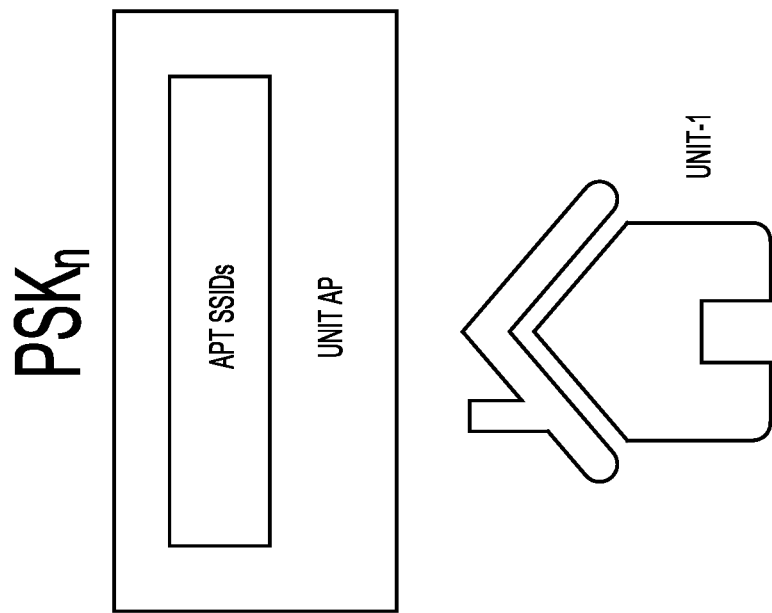
FIG.8

GROUPING USERS BY PRE-SHARED KEY (PSK) IN HOSPITALITY

This application claims priority to U.S. Provisional Patent Application No. 63/024,671, filed May 14, 2020, the subject matter of which is incorporated herein by reference in its entirety.

TECHNICAL FIELD

The present disclosure relates to wireless network management.

BACKGROUND

Landlords of multi-dwelling units (MDUs) often want to offer wireless network connectivity as a service to their tenants while simplifying the management and operation of the wireless network and providing the right level of segregation and policy. In a configuration where there are multiple dwellings, a frequent flow of incoming or leaving tenants, and shared areas (e.g., libraries, pools, etc.), there are many challenges.

BRIEF DESCRIPTION OF THE DRAWINGS

FIG. 5 illustrates the use of a Vendor-Specific Information Element in an authentication frame, according to an example embodiment.

FIG. 8 illustrates a different PSK being default for each access point (AP) advertising the same service set identifier (SSID), according to an example embodiment.

DESCRIPTION OF EXAMPLE EMBODIMENTS

Overview

Presented herein are techniques for allowing management entities of large dwelling (rental buildings or neighborhoods) to create and manage a different wireless network pre-shared key (PSK) per unit/tenant while using a single service set identifier (SSID) for the entire property. Each tenant can connect from their rental home and selected common areas. Tenants can allow selected other tenants to connect from their homes using different PSKs. Tenants can onboard new devices in designated units (their homes).

In one embodiment, a method includes defining a plurality of geographical zones corresponding to a geographical area that is serviced by a common service set identifier for a wireless local area network, assigning a pre-shared key to a mobile station based on the plurality of geographical zones, wherein the pre-shared key is associated with predetermined policies for a user of the mobile station, associating a media access control address of the mobile station with the pre-shared key, and controlling access of the mobile station to the wireless local area network based on the predetermined policies.

In another embodiment, an apparatus is provided. The apparatus may include a network interface unit configured to enable network communications, a memory configured to store logic instructions, and a processor, when executing the logic instructions, configured to define a plurality of geographical zones corresponding to a geographical area that is serviced by a common service set identifier for a wireless local area network, assign a pre-shared key to a mobile station based on the plurality of geographical zones, wherein the pre-shared key is associated with predetermined policies for a user of the mobile station, associate a media access control address of the mobile station with the pre-shared key, and control access of the mobile station to the wireless local area network based on the predetermined policies.

EXAMPLE EMBODIMENTS

Figure 1:
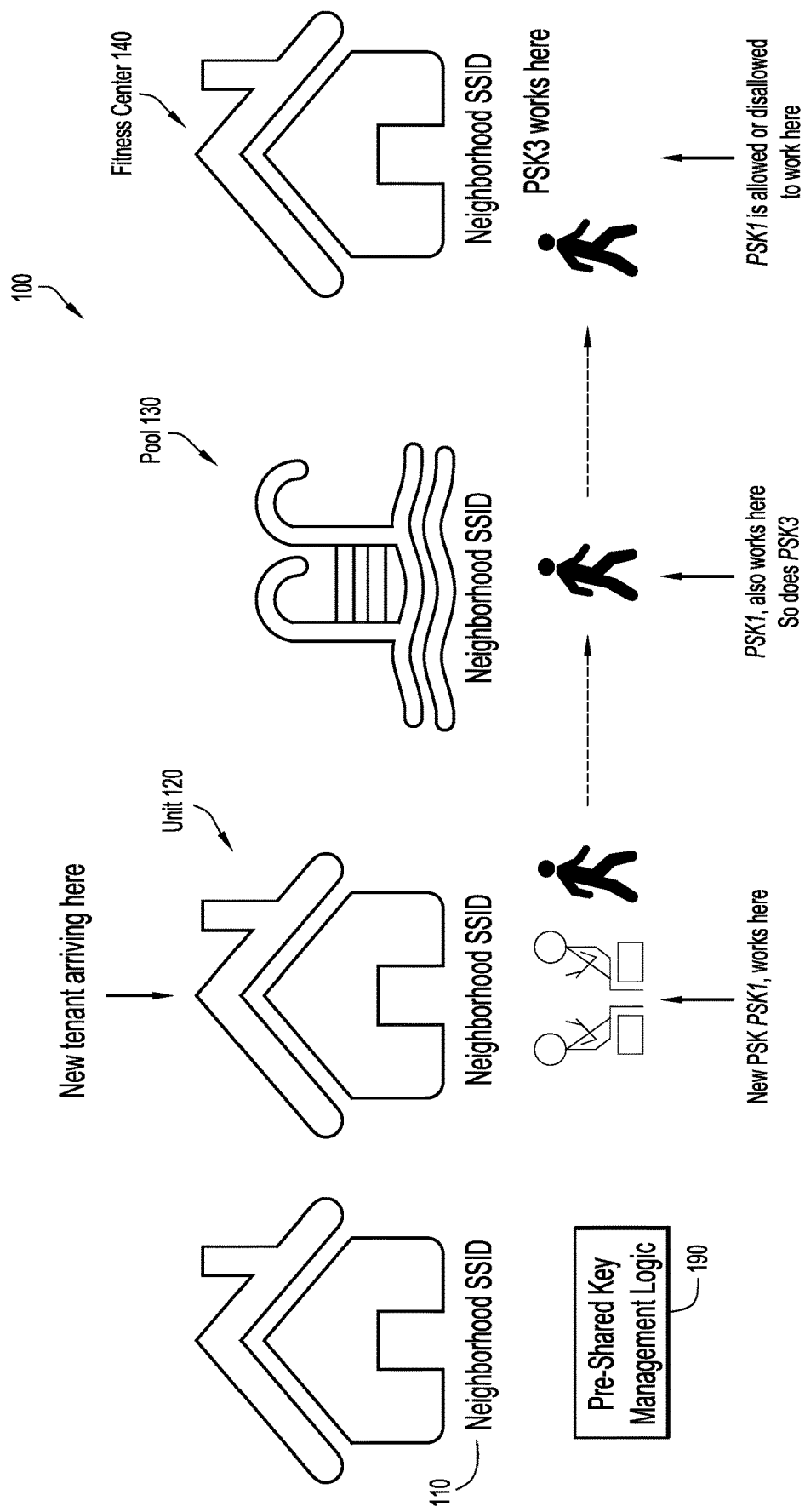
FIG. 1 is diagram depicting challenges associated with providing wireless network access in multi-dwelling communities for which the techniques presented herein are configured to address.

Providing wireless local area network (WLAN), e.g., Wi-Fi®, network connectivity to tenants of multi-dwelling units (MDUs) has challenges. Reference is made to FIG. 1, which is a diagram depicting challenges associated with providing wireless network access in multi-dwelling communities for which the techniques presented herein are configured to address using pre-shared key management logic 190 in accordance with an example embodiment. As can be seen in the figure, a single (neighborhood) service set identifier (SSID) 110 is typically assigned for the entire complex 100 so that users can walk to common areas, from their unit (e.g., apartment) 120, without having to learn a new SSID and so that the landlord only needs to manage a single SSID, instead of managing a different SSID per unit. For example, a user might first visit their new unit 120, and them later, and over time, a pool 130, or fitness center 140. Wireless network access at each of these locations may be controlled, as will be explained in more detail below, by pre-shared key management logic 190. At a high level pre-shared key management logic 190 assigns and keeps track of polices associated with pre-shared keys that are assigned to individual users (e.g., tenants).

In accordance with an embodiment, the SSID is protected by the pre-shared key (PSK). Open SSIDs are unacceptable for security and legal reasons; IEEE 802.1X security/authentication is too complex and not supported by many home-grade devices.

Also in accordance with an embodiment, pre-shared key management logic 190 enables each tenant to be in control of their unit 120. That is, each unit 120 should have its own PSK, to which multiple devices (e.g., up to 5) can attach, but a neighbor tenant should not be able to connect to someone else's access point (AP), if the AP is in another unit, unless authorized to do so by the tenant. On the other hand, all neighbors should be able to connect to the SSID on APs placed in common areas, with some restrictions. For example, some areas may require specific membership, e.g., pool 130 or fitness center 140 and only tenants matching the associated criteria should be able to connect from those areas. Finally, as new tenants come and go, the management of wireless network connectivity can be limited to adding and removing the PSK associated with the tenant. Pre-shared key management logic 190 is configured to provide tenant-specific management of wireless network access where a single shared SSID is deployed across an entire multi-dwelling complex 100.

One naive solution is to provide each tenant with his/her own PSK. This works well in each unit, but creates an issue for identifying which PSK needs to be used for a given wireless client in the common areas. An alternative option is called multi-PSK (mPSK), which limits the set of keys to a small set, e.g., five. When a client joins an SSID in a common area, a wireless local area network (LAN) controller (WLC) only needs to parse through 5 possible keys. However, the consequence is that multiple units have the same PSK (as there are five PSKs for the entire system, and likely more than five units).

Figure 2:
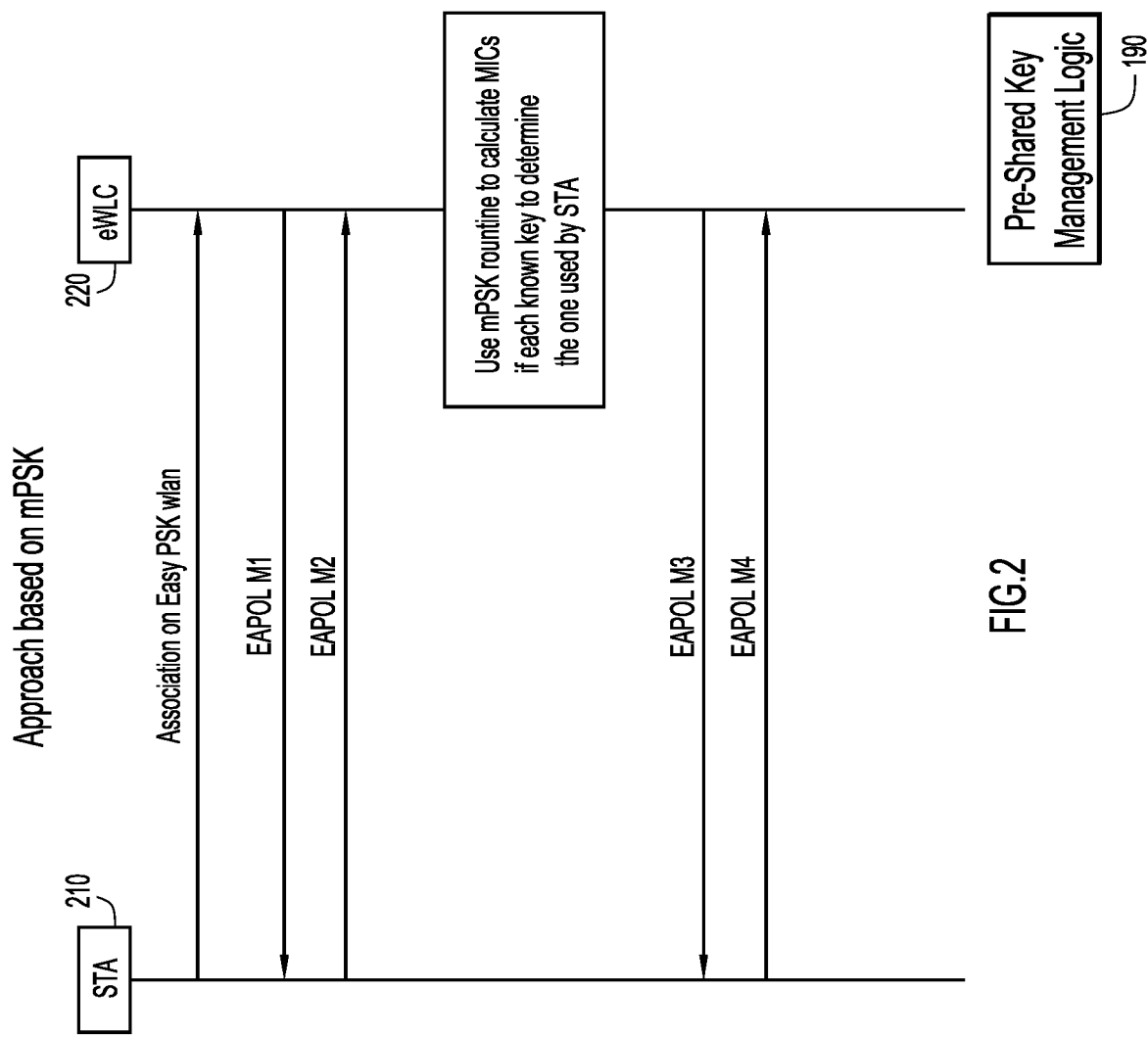
FIG. 2 illustrates Wi-Fi Protected Access 2 (WPA2) exchanges associated with multi-Pre-Shared Key (mPSK) techniques.

Reference is made to FIG. 2, which illustrates Wi-Fi Protected Access 2 (WPA2) exchanges associated with multi-Pre-Shared Key (mPSK) techniques. Suppose there is one PSK for the entire building/development, defined on the WLC. Key management is complex because the PSK needs to be changed for all tenants each time one tenant leaves. Now suppose that there is one key per client/unit (and a larger number of units means a large number of recorded PSKs in the WLC, e.g., 1024). If a new tenant simply configures one of these PSKs on their device, then at the first client-join time, the WLC or AP receives from a new media access control (MAC) address, a new Extensible Authentication Protocol (EAP) over LAN (EAPOL) M2 message, and has to try up to 1024 PSKs to verify if the key is valid.

The mPSK scenario is depicted in FIG. 2. As shown, a wireless station (STA) 210 initiates a connection to an extended WLC ("eWLC," or simply "WLC") 220 using Easy PSK. WLC 220 responds with an Extensible Authentication Protocol (EAP) over LAN (EAPOL) M1 message. STA 210, in response, sends an EAPOL M2 message. At this point, eWLC 220 uses an mPSK routine to calculate message information codes (MICs) of each known key to determine the one used by STA 210. Assuming the key is identified, WLC 220 sends an EAPOL M3 message, which triggers an EAPOL M4 message from STA 210.

Notably, however, the "brute force" method of FIG. 2 only works because the mPSK assumption is that there are only up to 5 keys, making the process bearable by the wireless infrastructure (AP or WLC). This procedure has a number of downsides. First, it is very computationally expensive, which impacts the join rate. It also impacts the join latency for any given client, degrading his experience. For example, if a larger set of keys is used, e.g., 1024, then the brute force method search time may exceed the time a client allocates to the association exchanges, thus causing the client to fail the first association attempt. The exchange may only be successful at the second or further subsequent attempt, depending on the brute force computation time. The client may stop trying after the first failure, or even second failure, and simply attempt another SSID. Second, mPSK is open to Denial-of-Service (DoS) attacks, where an attacker can start an association with different MAC addresses and fake keys in order to exhaust resources on the WLC and APs. A PSK mapper is defined that determines which PSK key the client is using. The PSK mapper may be embodied by, or be a function of, the WLC and/or APs. Lastly, mPSK does not work with the Wi-Fi Protected Access 3 (WPA3) standard, where Simultaneous Authentication of Equals (SAE) prevents "offline" dictionary attacks (such as the one needed to determine which of the, e.g., five, let alone, 1024, keys the client is using), and the WLC has no way to know which key the client is trying to use.

Accordingly, a solution is presented herein with negligible onboarding overhead or possibly none at all, that can support many (e.g., up to 1024) different PSKs in the same WLAN. This solution, referred to herein as "EasyPSK," allows PSK-based on boarding for multi-tenants, and is enabled by pre-shared key management logic that may be incorporated into WLC 220.

Phase 1: Units to PSK Mapping

Figure 3:
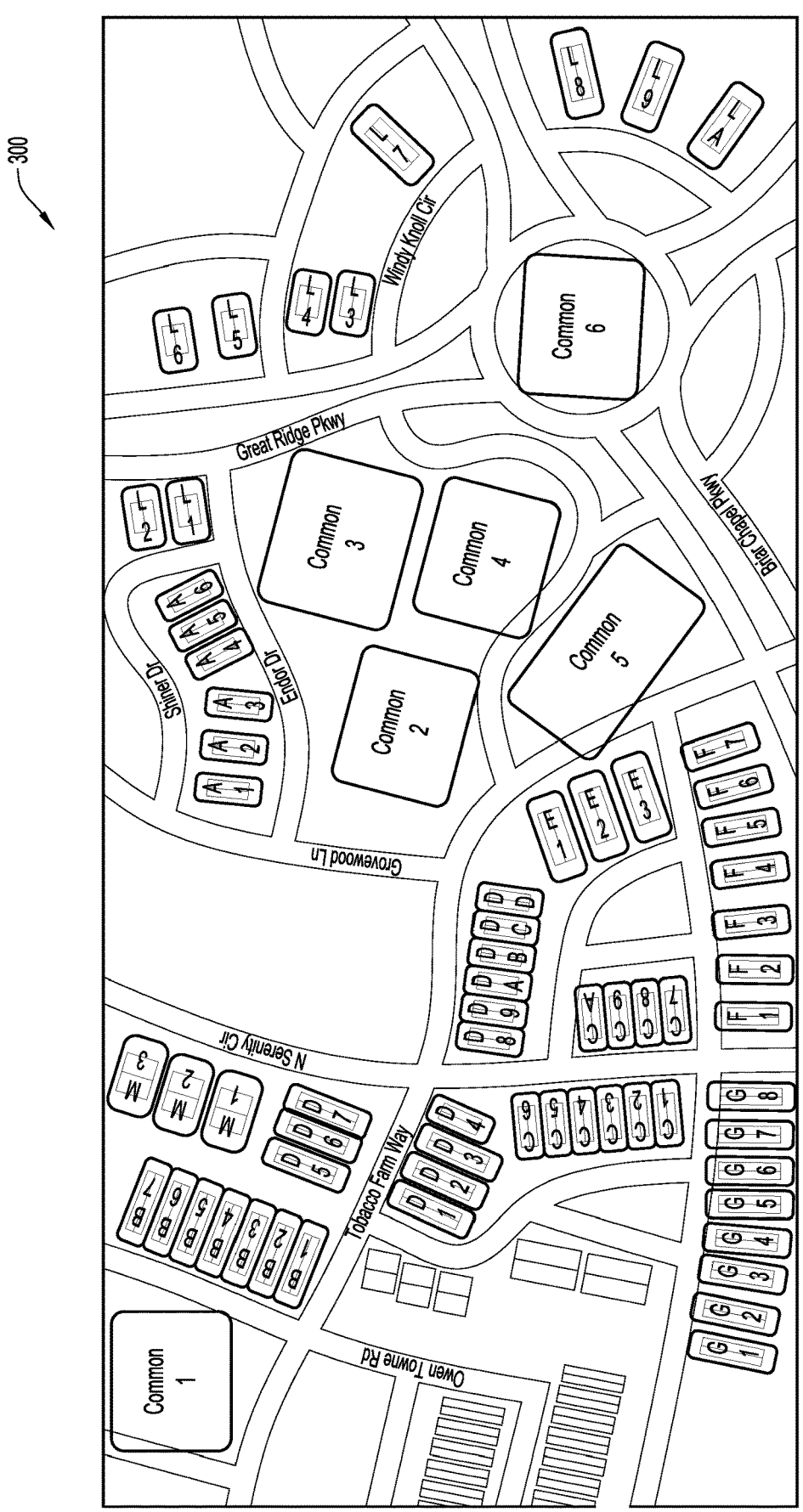
FIG. 3 illustrates a unit to zone mapping in a network controller, according to an example embodiment.

FIG. 3 illustrates a unit to zone mapping in a network controller, according to an example embodiment. More specifically, pre-shared key management logic 150, which may be hosted/executed on/by a management tool such as a network controller (e.g., Cisco's Digital Network Architecture (DNAC)), assigns zones (e.g., A1-A7, B1-B8, C1-CA, D1-DD, E1-E3, F1-F7, G1-GB, L1-LA, Common 1, Common 2, Common 3, Common 4, Common 5, Common 6) to a map 300. As indicated, the zones can be common areas or individual dwellings.

Using an Application Programming Interface (API) (or pre-shared key management logic 150 itself), a landlord company associates, in a database, each zone to one or more access points (APs).

Figure 4:
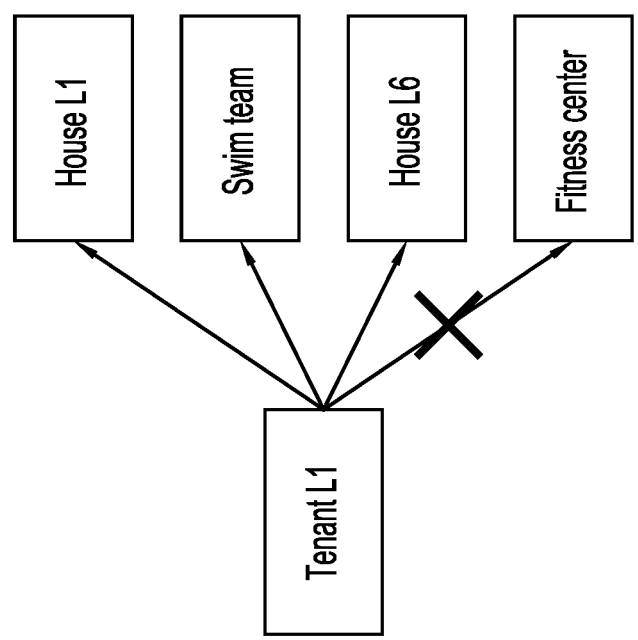
FIG. 4 illustrates a given tenant and PSK mapping to zone, according to an example embodiment.

In a private unit (house), a tenant can connect personal devices, and also (optionally) accept that other tenants may connect (friends/relatives in the same development project). The tenant can be allowed to connect to some common areas, but may not be allowed to connect in others, depending on optional memberships. That is, a policy is a set of authorizations, rate-limiting and other attributes associated to a particular user or tenant. Further, pre-shared key management logic 150 (e.g., via the API) associates each tenant policy to locations. For example, a tenant in L1 can be allowed to connect from their house and are also allowed to connect in their cousin's house L6. They may be further allowed to connect from the pool 130, but did not subscribe to the fitness package and thus they are prohibited from connecting from the fitness center 140. This, is best shown in FIG. 4.

Phase 2: PSK to Tenant STA/Client Mapping

In this phase, the landlord, via pre-shared key management logic 150, communicates one PSK to each tenant. Pre-shared key management logic 150 ensures that each tenant's device is associated to the tenant unit PSK. Several embodiments are envisioned.

Embodiment 1: A Key Index in Vendor Specific Information Element (VSIE)

In this embodiment, based on phase 1, the network controller (e.g., pre-shared key management logic 150) associates to each PSK an index number or value. Pre-shared key management logic 150 then sends to each WLC the indices and the PSKs. Each new tenant is also provided with their PSK and its index (as per phase 1). This solution is adapted to dwellings where landlords request tenants to install a dwelling property-specific app (usually these apps are used to fetch neighborhood announcements, common services hours, report issues, manage payments, etc.). In this scenario, the tenant configures the PSK and index in their mobile device. Then, at association, the station (STA)/client sends to the infrastructure the index value. The index can be sent in different possible formats, such as Vendor Specific IE in an authentication frame, association frame, or as an unsolicited action frame. This method allows the infrastructure to receive the index, and match the PSK attempts against a single PSK, thus reducing the search space. FIG. 5 shows the Vendor Specific Information Element 500 that may be used for this purpose as part of an authentication frame.

As those skilled in the art will appreciate, Embodiment 1 involves specific infrastructure support (i.e., VSIE), and an application executing on the client (i.e., STA). It is further noted that sending the key index does not increase the security exposure of the system. With traditional PSK, a single PSK is expected. Therefore, indicating the PSK index is equivalent to reducing the system exposure to a single PSK.

Figure 6:
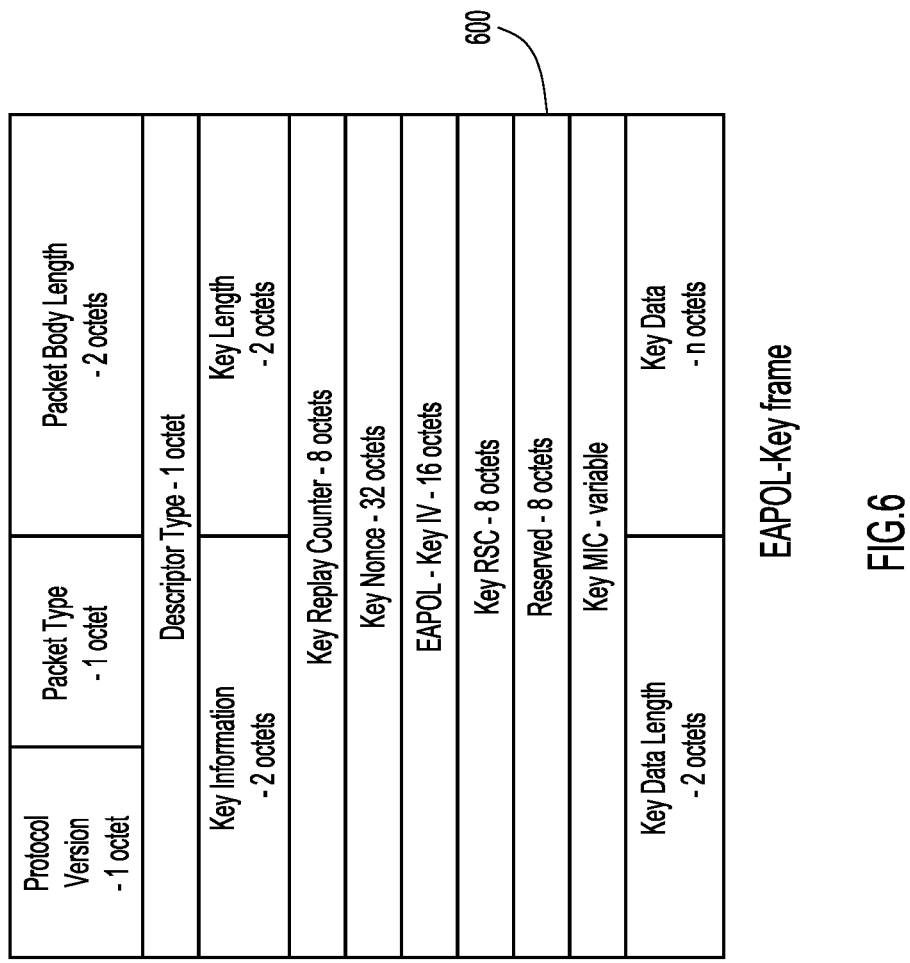
FIG. 6 illustrates the use of an option in an Extensible Authentication Protocol (EAP) over LAN (EAPOL) key frame, according to an example embodiment.

Embodiment 2: Extensible Authentication Protocol (EAP) Over LAN (EAPOL)-Key Frame Similar to Embodiment 1, the client is provided with both PSK and index (in the form of a single password/key). In this embodiment, the EAPOL-key Frame field 8 600 may be leveraged since it is left unused ("Reserved") in the IEEE 802.11 standards, as shown in FIG. 6. Field 8 600 was left as padding to allow the Key Information IE+Key Data IE to round up to an 8-multiple. This field may be used to carry the PSK index. In this embodiment, the PSK index is not a Layer 2 element, but the index provided by the landlord to the tenant. Just like in Embodiment 1, the index is then used to match the client attempt against a single PSK.

Embodiment 3: PSK Seed and AP Localization

Figure 7:
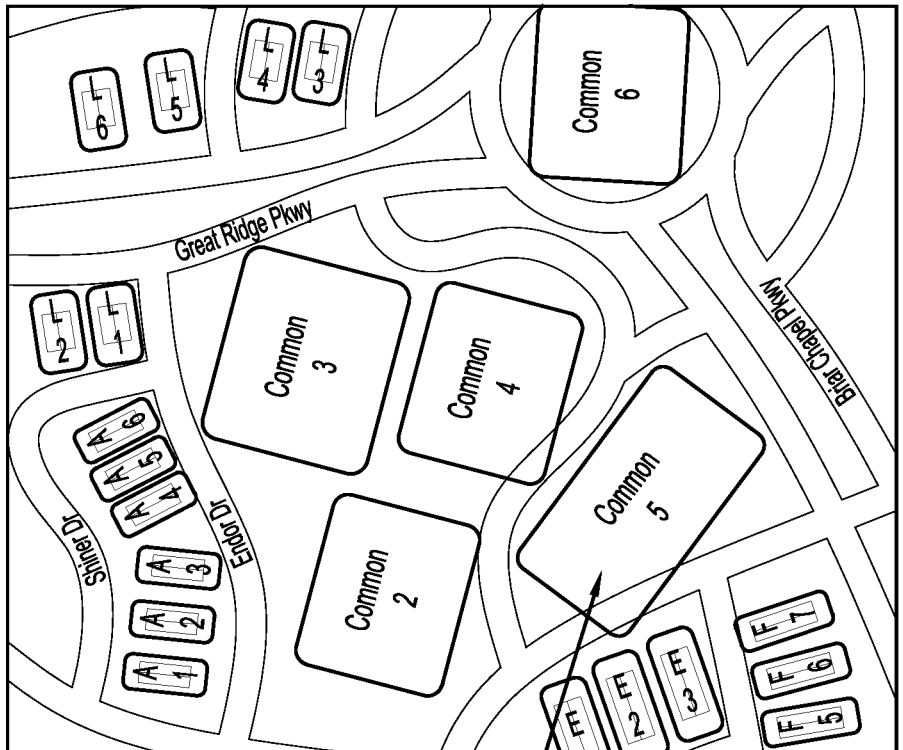
FIG. 7 illustrates a PSK to zone mapping by groups, according to an example embodiment.

It is noted that this embodiment does not rely on specific STA, AP or infrastructure support. Rather, in this embodiment, APs are separated into logical groups in pre-shared key management logic 150 as per phase 1. Then, each subgroup of APs is specifically logically associated with one or more PSKs (in the pre-shared key management logic 150). For example, a single PSK may be associated to APs in a particular house/apartment. In a common area accessible to all tenants, all PSKs may be associated as shown in FIG. 7, which illustrates a PSK to zone mapping by group, according to an example embodiment. As the pre-shared key management logic 150 is used to associate which tenant/unit has access to which common area, the associated PSK is added to the AP group for that common area. FIG. 8 illustrates how a different PSK, e.g., $PSK_n$ and $PSK_{n+1}$ are set as defaults for each unit (e.g., apartment) access point (AP) advertising the same service set identifier (SSID), according to an example embodiment.

As a consequence, APs deployed in a non-shared space (e.g., a particular unit) can be configured to service only a small subset of users (and a single tenant contract), and therefore the PSK search space is reduced to 1 (with WPA3, or a few PSKs, if the local policy allows more than one WPA2 PSK per unit).

Then, a seed-from-home method is instantiated. With this method, tenants are requested to establish the first connection from their home, apartment, or unit. As the connection AP is known, this method allows the search space to be reduced to a small set of keys. Then, once the STA authentication completes, the STA MAC address is mapped with the associated PSK.

In another variation, radio resource management (RRM) is used for APs to detect their neighbors. As the first on-boarding takes place, the PSK(s) matching the associating AP are attempted first. If the search fails, the neighboring APs search space is attempted, with the assumption that a neighbor's AP may provide a better signal (and the same SSID) as the local unit AP, if the user connects from some edge areas of the unit. Once the search succeeds, the device may be mapped to the correct unit. That is, pre-shared key management logic 150 may be configured to update the MAC address to PSK mapping after a given tenant first joins the system.

Subsequently, in common areas, pre-shared key management logic 150 performs a lookup to verify the existence of the MAC address in a MAC address to PSK mapping database of pre-shared key management logic 150. Authentication fails if the MAC address is not known.

In one embodiment, the AP in a common area is configured to send a new disassociation code called 'STA not in the MAC filter' when the STA is not present in the MAC address whitelist. This reason code can be used to surface to the user (through, e.g., a tenant/dwelling app), a message reminding tenants to establish the first connection from their home. Alternatively, an IEEE 802.11u VSIE may be used to provide the same information.

Once "on-boarded" (i.e., once registered in the system), the STA can roam, disconnect, reconnect in any part of the complex, near pool 130 or fitness center 140, etc. or anywhere where the particular tenant's connection is allowed (because the association MAC address to PSK is stored).

Some vendors envision the rotation of the MAC address during the session. In some implementations, the changing MAC address attempts to continue the session, treating the event as a form of roaming. As such, the STA attempts to reuse the same Pairwise Master Key Identifier (PMKID) (with a new MAC address). This case is simple to solve, as PMKID-to-PSK is already in the system. Therefore, this solution simply maps the new MAC to the same unit as the previous MAC through the PMKID entry. In other implementations, the STA merely de-associates and re-associates with the new MAC address. A 'public' (e.g. 802.11u) flag is used in the AP's beacons, probe responses and association responses to signal that the AP is in a common area, and that MAC address should not be rotated there. This embodiment may be appealing since connection from a common area is expected to be temporal (i.e., secondary connection, primary connection happening from home).

Embodiment 4: AP Localization with Hyperlocation

This embodiment is an extension of Embodiment 3 and uses location/hyperlocation to reduce ambiguities. In this variation, a map of which APs can be heard from each unit is built over time, using STAs probe requests and 802.11k beacon reports. As tenants connect different STAs over time from different locations of the unit, the signal to each detecting AP is recorded. As this training continues, in the pre-shared key management logic 150, each unit is associated to neighboring units and their APs, along with signal bleeding likelihood. Then, when a new tenant connects a new STA (with its associated initial channel scan), this solution uses the signal level on each detecting AP to determine the unit likelihood, and tries the PSK set associated to the unit in priority (even if the authentication/association requests are sent to another neighboring AP).

Embodiment 5: Light Fidelity (Li-Fi) Based Localization

Another extension of Embodiment 3 is possible through the use of Li-Fi enabled lightbulbs in an integrated light/wireless solution. In such "smart-home" environment, a network controller in associate with pre-shared key management logic 150 manages both lightbulbs and wireless access in the multi-dwelling units. Because each apartment has its own set of lightbulbs, these can be managed by the network controller to distribute the per-apartment unique onboard information to the wireless device. With this solution, the network controller records that the Li-Fi and the AP system are within the same zone (e.g., a unit), and passes to the Li-Fi AP the Wi-Fi PSK.

In this embodiment, an Opportunistic Wireless Encryption (OWE) connection, specified in IETF RFC 8110, is established between the client and the Li-Fi AP. In another embodiment, the Li-Fi AP emits a public key (e.g., Device Provisioning Protocol (DPP)-alike), allowing the Li-Fi client to connect. The PSK is passed through that connection.

In another embodiment (one-way Li-Fi), the Li-Fi AP broadcasts the PSK. This mode may be less secure, and can be restricted to the areas of the home/apartment that minimize the risk of signal bleed through (no windows, windows with high absorptions, conditional to smart blinds being down, etc.). The broadcast can also be limited in time, for example only activated when a new MAC address attempts to connect to the apartment Wi-Fi SSID.

Phase 3: PSK to MAC Management.

In order to be able to serve and join clients, a persistent storage is provided of the client MAC (client MAC address) to PSK association. Conceptually, this can be trivially done in the WLC. In multi-WLC scenarios, the solution would benefit from external storage in order to avoid inter-WLC synchronization and persistent storage.

One solution is to store the MAC and PSK in the network controller, and more specifically in pre-shared key management logic 150. There are at least two other extensions to solve this issue, by delegating part of the mapping storage to an Authentication, Authorization, and Accounting (AAA) server.

Embodiment 6: AAA PSK Exchange

In some embodiments, both an identity services engine (ISE) (an access control policy platform) and the WLC need to know a PSK. Currently, the AAA allows to return a MSK/PMK after individual device authentication on the AAA, or the WLC to perform authentication locally (and thus not perform key-related exchanges with RADIUS).

The method described herein defines a new PSK exchange. In a protected tunnel with the AAA server (e.g., RADSEC), the WLC queries, or updates the AAA server with an accounting frame, containing IETF attribute 31 (Calling-Station-ID, the STA MAC), IETF "vendor proprietary" attributes 141 (user-acct-key, the PSK) and 142 (user-acct-base, a unique index for that PSK). Other containers are also possible.

The outcome of this method is that the WLC and the AAA server can exchange a PSK if needed, along with a mapped MAC address if necessary, and along with a unique index for that key, if necessary. Such exchange is expected to occur once for each PSK.

Embodiment 7: AAA PSK Policy Delegation

Figure 9:
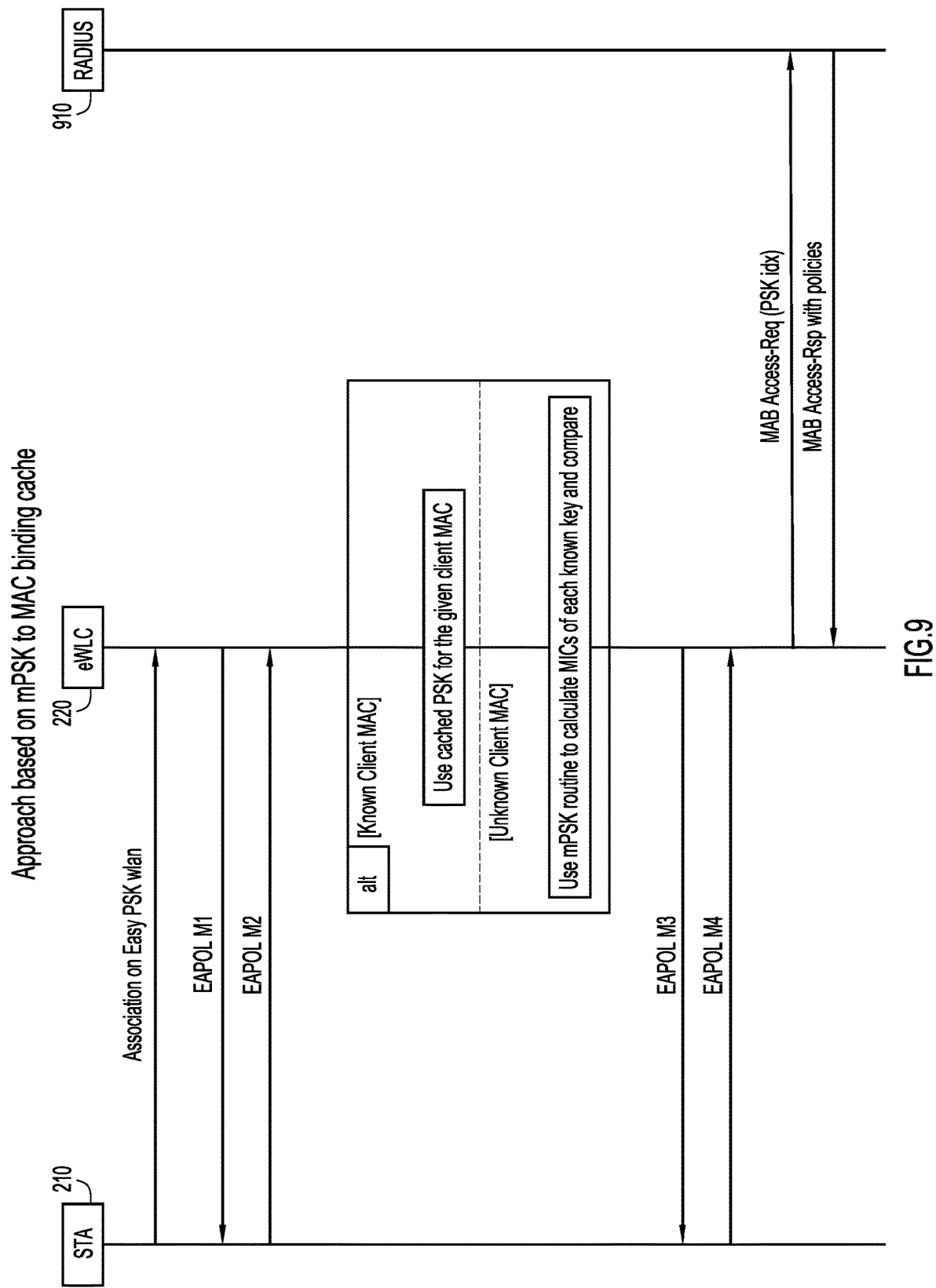
FIG. 9 illustrates a message flow for PSK association with internal known client cache, according to an example embodiment.

Reference is now made to FIG. 9, which illustrates a call flow for PSK association with internal known client cache, according to an example embodiment. In the embodiment of FIG. 9, the WLC performs the PSK search. In this case, STA 210 associates to the WLAN via the WLC 220. After the EAPOL M1 and M2 message exchange, WLC 220 checks if the STA MAC address is known. If the MAC address is known, the WLC continues with the EAPOL M3 frame, and subsequent EAPOL M4 message. If the MAC address is not known, WLC 220 performs a search as in the previous embodiments. Once the 4-way handshake completes successfully, WLC 220 queries the radius (i.e., AAA) server 910, using a MAC Authentication Bypass (MAB) frame, forwarding the PSK index, optionally the STA MAC address, and optionally the called-Station-ID (the AP to which the STA 210 is attempting to connect). The radius server 910 returns in the MAB response, the policies for that PSK index in that location (e.g., access not allowed or BW=0). Those skilled in the art will appreciate that these messages can also be carried in other containers (e.g., Change of Authorization (CoA) or others).

Embodiment 8: AAA PSK Search Delegation

Figure 10:
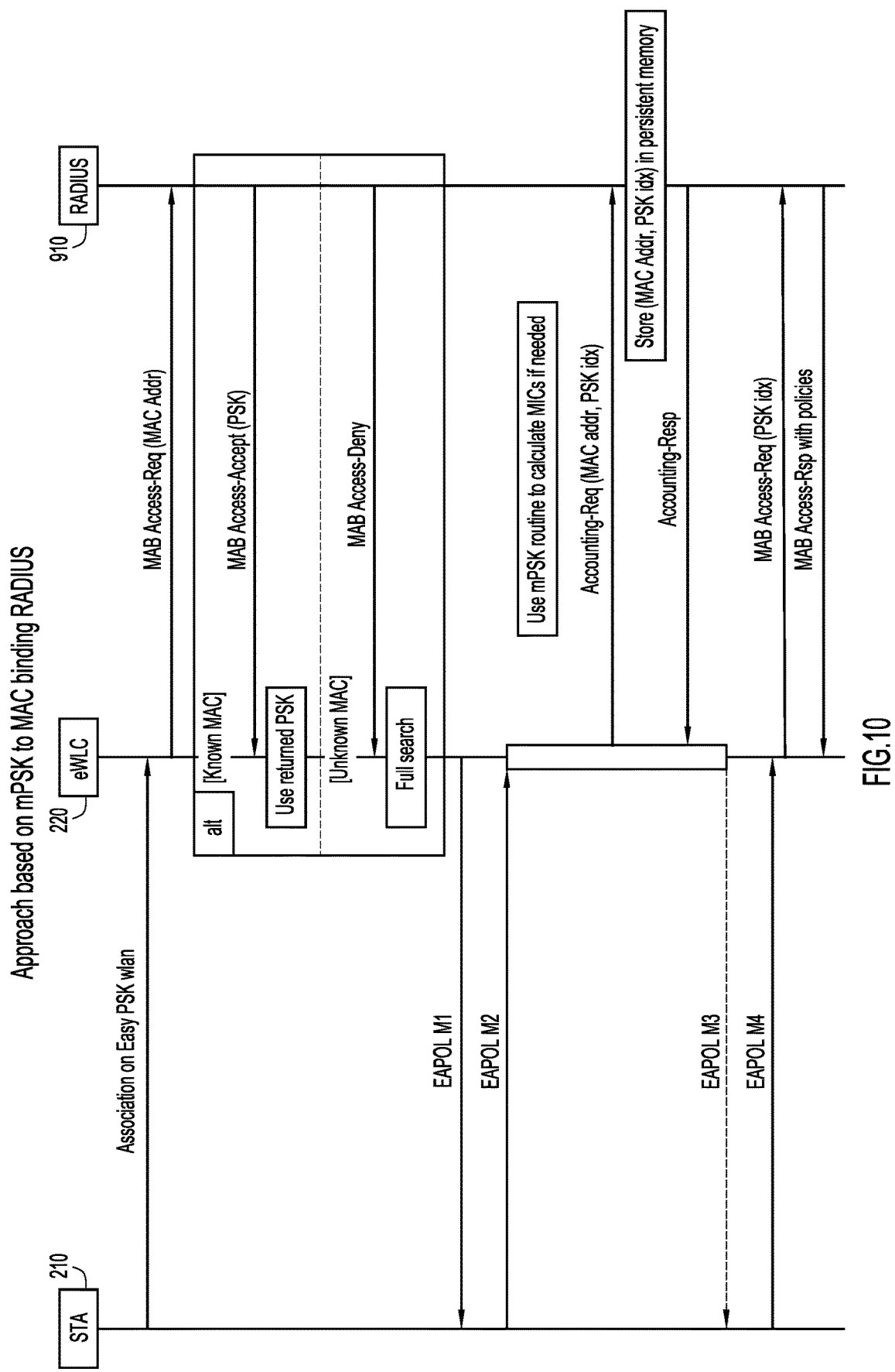
FIG. 10 illustrates a message flow for PSK association with known client cache on a Remote Authentication Dial-In User Service (RADIUS) server, according to an example embodiment.

In another embodiment, the search task is initially performed in the AAA server. Reference is now made to FIG. 10, which illustrates a call flow for PSK association with known client cache on a Remote Authentication Dial-In User Service (RADIUS) server, according to an example embodiment. In this case, at the association phase, the WLC 220 verifies if it has a map between the requesting MAC address and the PSK (and uses that PSK if a mapping is found). If the MAC address is not found, the WLC 220 relays the query to the radius server 910. The message can be a MAB.

The radius server 910 then performs a search for the MAC address. If the MAC address is found, the radius server 910 returns the associated PSK as described in Embodiment 6. This case is relevant in a multi-WLC scenario where the tenant authenticated first against another WLC. If the MAC address is not found, the radius server 910 returns a failure message (e.g. MAB Access Deny). In this case, the WLC 220 performs a key search based on the embodiments above, then continues the 4-way EAPOL handshake if the search is successful.

At the conclusion of the 4-way EAPOL handshake, the WLC 220 can still query the radius server 910 for a policy, as described above.

Embodiment 9: User Private Network (UPN) Integration

Once authentication completes, the PSK is used to define a User Private Network (UPN). In one embodiment, each PSK defines its own private network. The WLC 220 only allows communication between devices sharing the same PSK, and defines a group key (GTK) per PSK on APs in shared spaces where multiple tenants connect simultaneously.

In another embodiment, where WPA2 and multiple keys are used, the apartment is the group unit, and communication is allowed between all stations using the same set of WPA2 keys.

Figure 11:
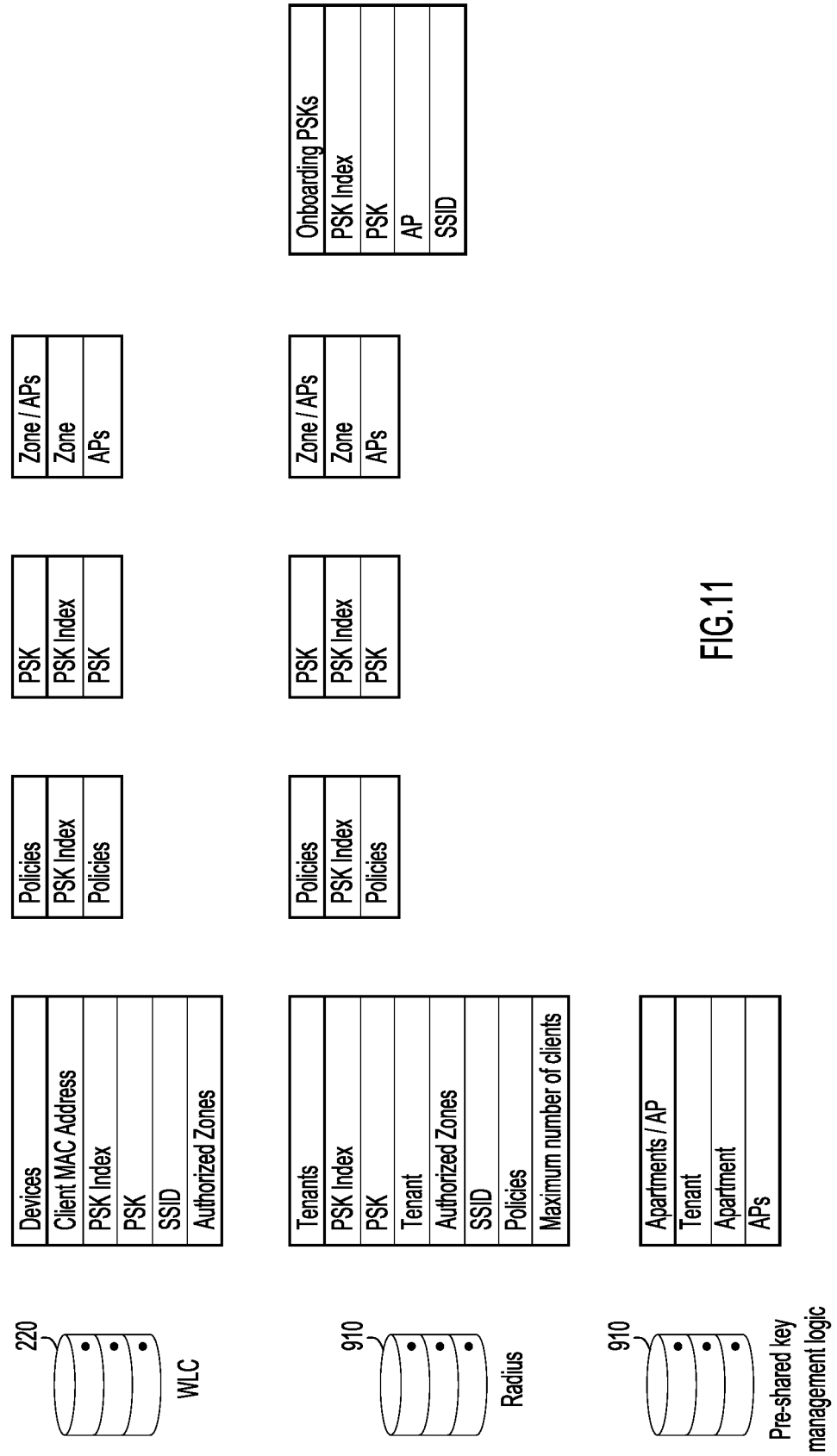
FIG. 11 shows a database scheme for associating the several parameters described herein, according to an example embodiment.

FIG. 11 shows a database scheme for associating the several parameters described according to an example embodiment. As can be seen in FIG. 11, WLC 220 may maintain information about devices (e.g., STAs), policies, PSK, and zone/APs. Radius server 910 may maintain information about tenants, policies, PSK, zone/APs and onboarding PSKs. And pre-shared key management logic 150 may maintain information about apartments (units) and APs. Those skilled in the art will appreciate that the location where the several data elements are stored is provided as an example, and other distributions or arrangements are possible.

Figure 12A:
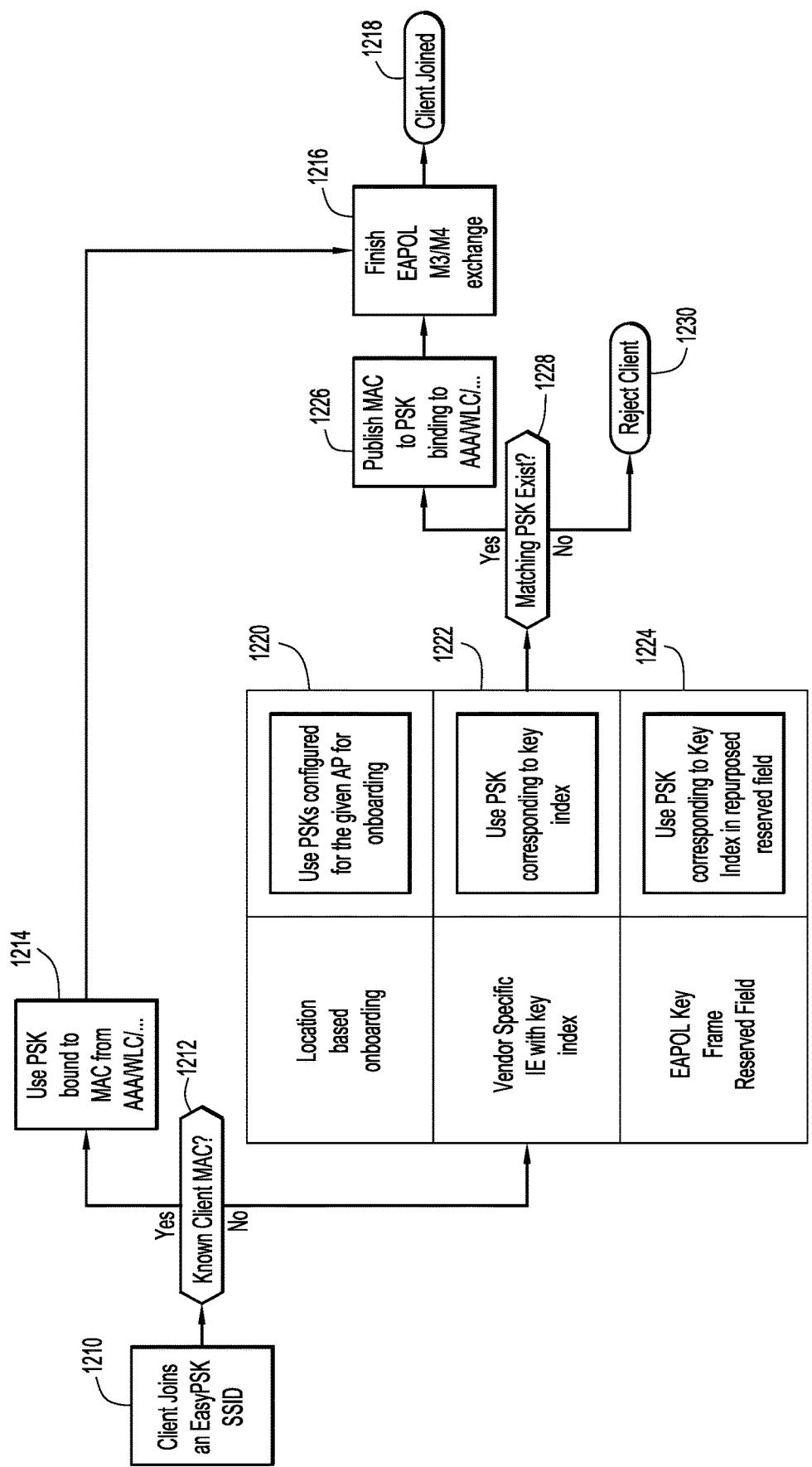
FIGS. 12A and 12B are flowcharts depicting operations that may be executed by pre-shared key management logic, according to an example embodiment.

FIG. 12A is a flowchart depicting a series of operations that may be executed by pre-shared key management logic 150 according to an example embodiment. At 1210, a client or STA joins an "Easy PSK" SSID, i.e., a SSID protected by a PSK managed in accordance with the embodiments described herein, using, e.g., EAPOL M1 and M2 message exchanges. At 1212, a WLC or pre-shared key management logic 150 (or some combination thereof) determines if the MAC address of the STA is known. If yes, at 1214, the PSK that is bound to the MAC address is used for communicating with the STA. That association may be gleaned from the WLC, pre-shared key management logic 150, radius (AAA) server, etc. as described herein. At 1216, the STA finishes with EAPOL M3 and M4 message exchange, and at 1218 the STA or client joins the WLAN.

On the other hand, if at operation 1212, the MAC of the STA was not known, then one of three possible operations are possible to find a match between the MAC address of the STA and a PSK. At 1220, location-based onboarding may be used. This onboarding can make use of the PSKs configured for a given AP at the location. At 1222, the STA may be given a PSK via a VSIE using an index, and then a PSK corresponding to that index is used. Alternatively, at 1224, a PSK index value can be delivered to the STA via an EAPOL key frame reserved field, and then the PSK corresponding to that index may be used. In the end, at 1228, pre-shared key management logic 150 and/or WLC 220 determines if there is a match between the MAC address of the STA seeking to join the wireless network and a PSK. If not, the STA (client) is rejected at 1230.

If there is a match between the MAC address of the STA and a PSK, then at 1226 pre-shared key management logic 150 may publish that binding to a radius (AAA) server, WLC or other node that may make use of such binding to maintain or establish a desired policy. Operations 1216 and 1218 are then execute to enable the STA (client) to join the WLAN.

Figure 12B:
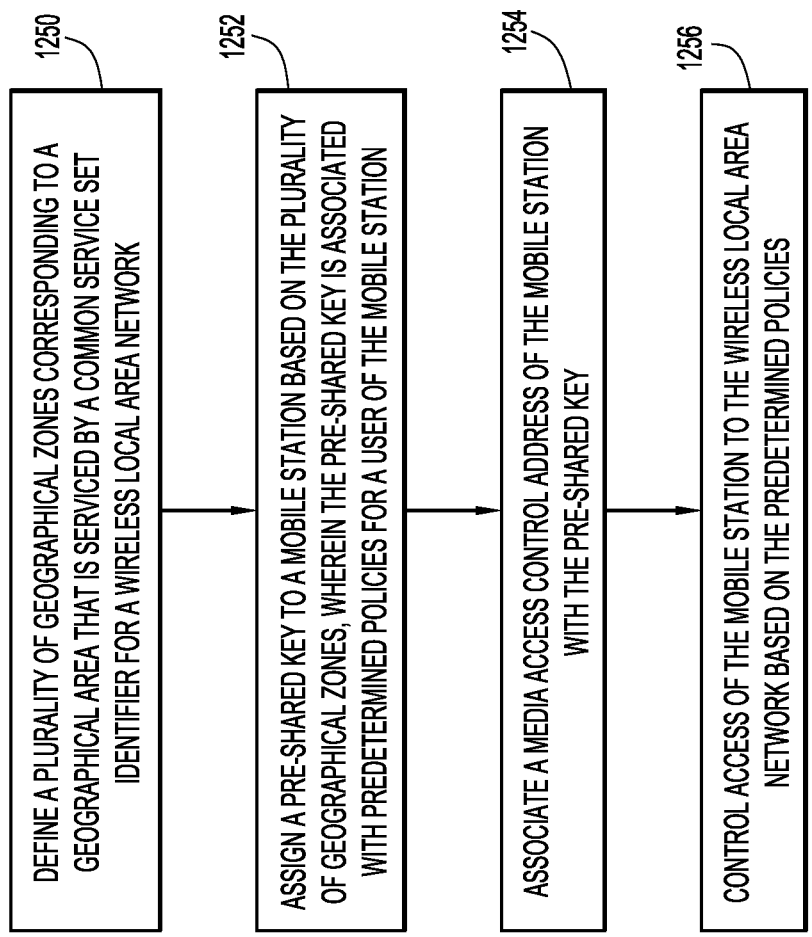

FIG. 12B is a flowchart depicting another series of operations that may be executed by pre-shared key management logic 150 according to an example embodiment. At 1250, an operation is configured to define a plurality of geographical zones corresponding to a geographical area that is serviced by a common service set identifier for a wireless local area network. At 1252, an operation is configured to assign a pre-shared key to a mobile station based on the plurality of geographical zones, wherein the pre-shared key is associated with predetermined policies for a user of the mobile station. At 1254, an operation is configured to associate a media access control address of the mobile station with the pre-shared key. And, at 1256, an operation is configured to control access of the mobile station to the wireless local area network based on the predetermined policies.

In summary, methods are described that enable management entities of large dwelling (rental buildings or neighborhood) to create and manage a different PSK per unit/tenant while using a single SSID for the entire property. Each tenant can connect from their rental home and selected common areas. Tenants can allow selected other tenants to connect from their homes.

Figure 13:
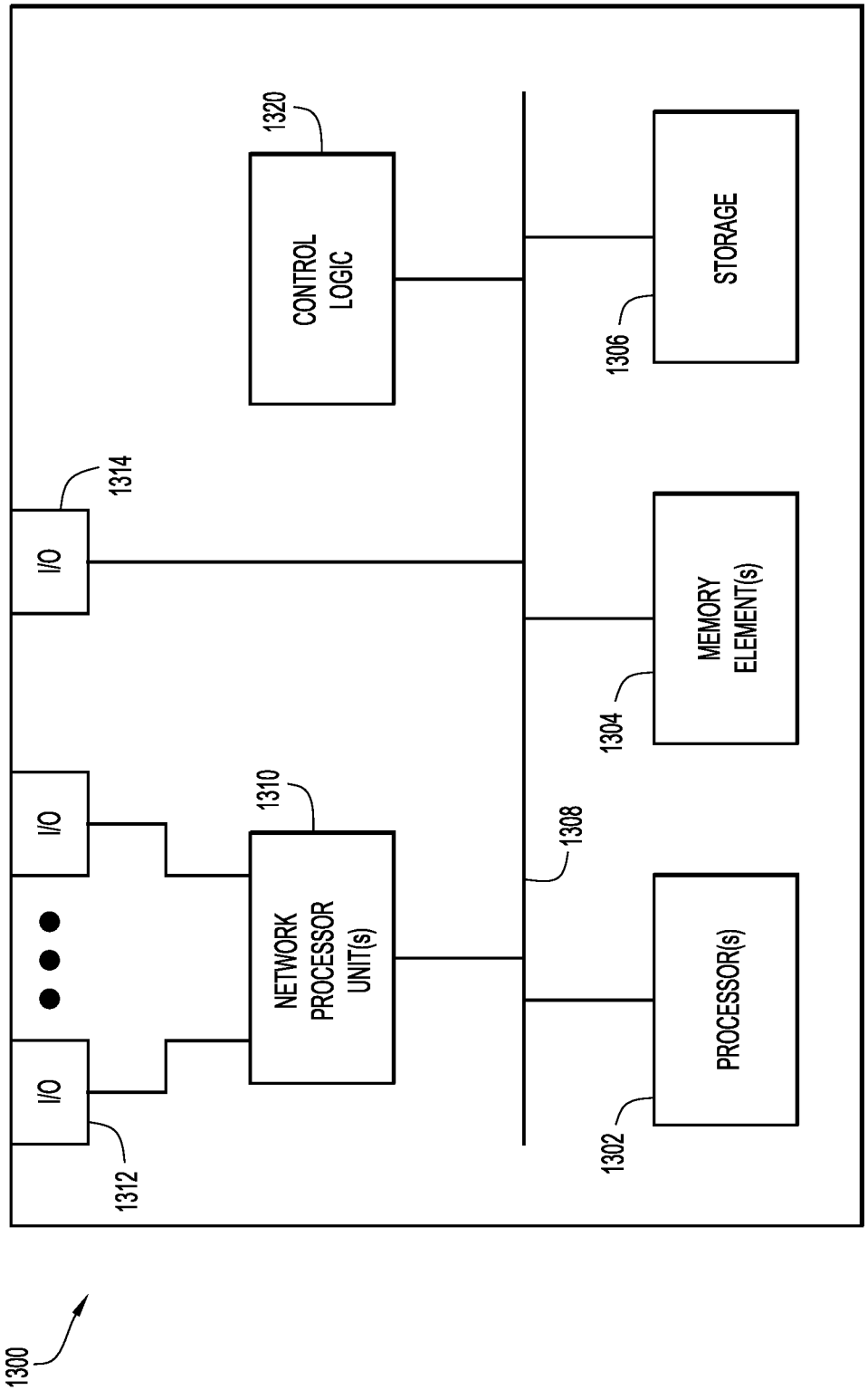
FIG. 13 illustrates a hardware block diagram of a computing device that may perform the functions of a client, a station, a network controller, and/or an access point referred to herein in connection with the techniques depicted in FIGS. 1-12B.

FIG. 13 illustrates a hardware block diagram of a computing device 1300 that may perform functions associated with operations discussed herein in connection with the techniques depicted by FIGS. 1-12B. In various embodiments, a computing device, such as computing device 1300 or any combination of computing devices 1300, may be configured as any entity/entities as discussed for the techniques depicted in connection with FIGS. 1-12B in order to perform operations of the various techniques discussed herein.

In at least one embodiment, the computing device 1300 may include one or more processor(s) 1302, one or more memory element(s) 1304, storage 1306, a bus 1308, one or more network processor unit(s) 1310 interconnected with one or more network input/output (I/O) interface(s) 1312, one or more I/O interface(s) 1314, and control logic 1320. In various embodiments, instructions associated with logic for computing device 1300 can overlap in any manner and are not limited to the specific allocation of instructions and/or operations described herein. That is, control logic 1320 may embody instructions to execute pre-shared key management logic 150.

In at least one embodiment, processor(s) 1302 is/are at least one hardware processor configured to execute various tasks, operations and/or functions for computing device 1300 as described herein according to software and/or instructions configured for computing device 1300. Processor(s) 1302 (e.g., a hardware processor) can execute any type of instructions associated with data to achieve the operations detailed herein. In one example, processor(s) 1302 can transform an element or an article (e.g., data, information) from one state or thing to another state or thing. Any of potential processing elements, microprocessors, digital signal processor, baseband signal processor, modem, PHY, controllers, systems, logic, and/or machines described herein can be construed as being encompassed within the broad term 'processor'.

In at least one embodiment, memory element(s) 1304 and/or storage 1306 is/are configured to store data, information, software, and/or instructions associated with computing device 1300, and/or logic configured for memory element(s) 1304 and/or storage 1306. For example, any logic described herein (e.g., control logic 1320) can, in various embodiments, be stored for computing device 1300 using any combination of memory element(s) 1304 and/or storage 1306. Note that in some embodiments, storage 1306 can be consolidated with memory element(s) 1304 (or vice versa), or can overlap/exist in any other suitable manner.

In at least one embodiment, bus 1308 can be configured as an interface that enables one or more elements of computing device 1300 to communicate in order to exchange information and/or data. Bus 1308 can be implemented with any architecture designed for passing control, data and/or information between processors, memory elements/storage, peripheral devices, and/or any other hardware and/or software components that may be configured for computing device 1300. In at least one embodiment, bus 1308 may be implemented as a fast kernel-hosted interconnect, potentially using shared memory between processes (e.g., logic), which can enable efficient communication paths between the processes.

In various embodiments, network processor unit(s) 1310 may enable communication between computing device 1300 and other systems, entities, etc., via network I/O interface(s) 1312 to facilitate operations discussed for various embodiments described herein. In various embodiments, network processor unit(s) 1310 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1300 and other systems, entities, etc. to facilitate operations for various embodiments described herein. In various embodiments, network I/O interface(s) 1312 can be configured as one or more Ethernet port(s), Fibre Channel ports, and/or any other I/O port(s) now known or hereafter developed. Thus, the network processor unit(s) 1310 and/or network I/O interface(s) 1312 may include suitable interfaces for receiving, transmitting, and/or otherwise communicating data and/or information in a network environment.

I/O interface(s) 1314 allow for input and output of data and/or information with other entities that may be connected to computer device 1300. For example, I/O interface(s) 1314 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1320 can include instructions that, when executed, cause processor(s) 1302 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1320) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software (potentially inclusive of object code and source code), etc.) for execution by one or more processor(s), and/or other similar machine, etc. Generally, memory element(s) 1304 and/or storage 1306 can store data, software, code, instructions (e.g., processor instructions), logic, parameters, combinations thereof, and/or the like used for operations described herein. This includes memory element(s) 1304 and/or storage 1306 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

In sum, in one embodiment a method is provided. The method includes defining a plurality of geographical zones corresponding to a geographical area that is serviced by a common service set identifier for a wireless local area network; assigning a pre-shared key to a mobile station based on the plurality of geographical zones, wherein the pre-shared key is associated with predetermined policies for a user of the mobile station; associating a media access control address of the mobile station with the pre-shared key; and controlling access of the mobile station to the wireless local area network based on the predetermined policies.

In an embodiment, the method may further include respectively associating access points for the wireless local area network to individual geographical zones in the plurality of geographical zones.

The method may also include supplying the pre-shared key to the mobile station via an application executing on the mobile station.

In an embodiment, the plurality of geographical zones may include at least one of an individual living space or a common area in a multi-dwelling complex.

The method still further include supplying a pre-shared key index value corresponding to the pre-shared key to the mobile station via a vendor specific information element in an authentication frame body.

The method also include supplying a pre-shared key index value corresponding to the pre-shared key to the mobile station via a field in an Extensible Authentication Protocol (EAP) over local area network (LAN) (EAPOL) key frame.

In an embodiment, a wireless local area network controller may determine whether a media access control address of a given mobile station that is attempting to associate with the wireless local area network is known, and when the media access control address of the given mobile station is known, communicate with the given mobile station using a predetermined pre-shared key that has been assigned to the given mobile station.

The method may also include sending a query to a radius server that requests policies associated with the given mobile station. The query may include an index value corresponding to the pre-shared key that has been assigned to the given mobile station.

The method may also include sending the query via a media access control Authentication Bypass (MAB) frame.

In another embodiment, an apparatus is provided. The apparatus includes a network interface unit configured to enable network communications; a memory configured to store logic instructions; and a processor, when executing the logic instructions, configured to: define a plurality of geographical zones corresponding to a geographical area that is serviced by a common service set identifier for a wireless local area network; assign a pre-shared key to a mobile station based on the plurality of geographical zones, wherein the pre-shared key is associated with predetermined policies for a user of the mobile station; associate a media access control address of the mobile station with the pre-shared key; and control access of the mobile station to the wireless local area network based on the predetermined policies.

The processor may be further configured to respectively associate access points for the wireless local area network to individual geographical zones in the plurality of geographical zones.

The processor may still be further configured to supply the pre-shared key to the mobile station via an application executing on the mobile station.

In an embodiment, the plurality of geographical zones includes at least one of an individual living space or a common area in a multi-dwelling complex.

The processor may also be is further configured to supply a pre-shared key index value corresponding to the pre-shared key to the mobile station via a vendor specific information element in an authentication frame body. Alternatively, or in addition, the processor may be further configured to supply a pre-shared key index value corresponding to the pre-shared key to the mobile station via a field in an Extensible Authentication Protocol (EAP) over local area network (LAN) (EAPOL) key frame.

In an embodiment, the processor may be further configured to determine whether a media access control address of a given mobile station that is attempting to associate with the wireless local area network is known, and when the media access control address of the given mobile station is known, communicate with the given mobile station using a predetermined pre-shared key that has been assigned to the given mobile station.

A non-transitory computer readable storage media encoded with instructions is also provided. The non-transitory computer readable storage media is encoded with instructions that, when executed by a processor, cause the processor to: define a plurality of geographical zones corresponding to a geographical area that is serviced by a common service set identifier for a wireless local area network; assign a pre-shared key to a mobile station based on the plurality of geographical zones, wherein the pre-shared key is associated with predetermined policies for a user of the mobile station; associate a media access control address of the mobile station with the pre-shared key; and control access of the mobile station to the wireless local area network based on the predetermined policies.

In an embodiment, the instructions, when executed by the processor, cause the processor to respectively associate access points for the wireless local area network to individual geographical zones in the plurality of geographical zones.

And in another embodiment, the instructions, when executed by the processor, cause the processor to supply the pre-shared key or a pre-shared key index value corresponding to the pre-shared key to the mobile station via an application executing on the mobile station.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    defining geographical zones within a predetermined single geographical area that is serviced by a single service set identifier for a wireless local area network;
    pre-assigning, respectively, unique pre-shared keys to the geographical zones;
    during a first on-boarding process of a first mobile station at a first one of the geographical zones, associating a media access control address of the first mobile station with a first unique pre-shared key previously pre-assigned to the first one of the geographical zones;
    during a second on-boarding process of a second mobile station at a second one of the geographical zones, associating a media access control address of the second mobile station with a second unique pre-shared key previously pre-assigned to the second one of the geographical zones; and
    after completion of the first on-boarding process and the second on-boarding process, enabling access of both the first mobile station and the second mobile station to a common user area of the wireless local area network within the predetermined single geographical area that is serviced by the single service set identifier using, for the first mobile station, the first unique pre-shared key previously pre-assigned to the one of the geographical zones and using, for the second mobile station, the second unique pre-shared key previously pre-assigned to the second one of the geographical zones, wherein the access is enabled based on the media access control address of the first mobile station, based on the media access control address of the second mobile station, and based on predetermined policies.

2. The method of claim 1, further comprising respectively associating access points for the wireless local area network to individual ones of the geographical zones.

3. The method of claim 1, further comprising supplying the first unique pre-shared key previously pre-assigned to the one of the geographical zones to the mobile station via an application executing on the first mobile station.

4. The method of claim 1, wherein the geographical zones comprise at least one of an individual living space or a common area in a multi-dwelling complex.

5. The method of claim 1, further comprising supplying a pre-shared key index value corresponding to the first unique pre-shared key previously pre-assigned to the one of the geographical zones to the mobile station via a vendor specific information element in an authentication frame body.

6. The method of claim 1, further comprising supplying a pre-shared key index value corresponding to the first unique pre-shared key previously pre-assigned to the one of the geographical zones to the mobile station via a field in an Extensible Authentication Protocol (EAP) over local area network (LAN) (EAPOL) key frame.

7. The method of claim 1, further comprising a wireless local area network controller determining whether a media access control address of the first mobile station that is attempting to associate with the wireless local area network is known to the wireless local area network controller, and when the media access control address of the first mobile station is known to the wireless local area network controller, communicating with the first mobile station using first unique pre-shared key previously pre-assigned to the first one of the geographical zones.

8. The method of claim 7, further comprising sending a query to a radius server that requests policies associated with the first mobile station.

9. The method of claim 8, wherein the query includes an index value corresponding to the first unique pre-shared key previously pre-assigned to the one of the geographical zones.

10. The method of claim 8, further comprising sending the query via a media access control Authentication Bypass (MAB) frame.

11. An apparatus comprising:
a network interface unit configured to enable network communications;
a memory configured to store logic instructions; and
a processor, when executing the logic instructions, configured to:
define geographical zones within a predetermined single geographical area that is serviced by a single service set identifier for a wireless local area network;
pre-assign, respectively, unique pre-shared keys to the geographical zones;
during a first on-boarding process of a first mobile station at a first one of the geographical zones, associate a media access control address of the first mobile station with a first unique pre-shared key previously pre-assigned to the first one of the geographical zones;
during a second on-boarding process of a second mobile station at a second one of the geographical zones, associating a media access control address of the second mobile station with a second unique pre-shared key previously pre-assigned to the second one of the geographical zones; and
after completion of the first on-boarding process and the second on-boarding process, enable access of both the first mobile station and the second mobile station to a common user area of the wireless local area network within the predetermined single geographical area that is serviced by the single service set identifier using, for the first mobile station, the first the unique pre-shared key previously pre-assigned to the first one of the geographical zones and using, for the second mobile station, the second unique pre-shared key previously pre-assigned to the second one of the geographical zones,
wherein the access is enabled based on the media access control address of the first mobile station, based on the media access control address of the second mobile station, and based on predetermined policies.

12. The apparatus of claim 11, wherein the processor is further configured to respectively associate access points for the wireless local area network to individual ones of the geographical zones.

13. The apparatus of claim 11, wherein the processor is further configured to supply the first unique pre-shared key previously pre-assigned to the first one of the geographical zones to the mobile station via an application executing on the mobile station.

14. The apparatus of claim 11, wherein the geographical zones comprise at least one of an individual living space or a common area in a multi-dwelling complex.

15. The apparatus of claim 11, wherein the processor is further configured to supply a pre-shared key index value corresponding to the first unique pre-shared key previously pre-assigned to the first one of the geographical zones to the first mobile station via a vendor specific information element in an authentication frame body.

16. The apparatus of claim 11, wherein the processor is further configured to supply a pre-shared key index value corresponding to the first unique pre-shared key previously pre-assigned to the first one of the geographical zones to the first mobile station via a field in an Extensible Authentication Protocol (EAP) over local area network (LAN) (EAPOL) key frame.

17. The apparatus of claim 11, wherein the processor is further configured to determine whether a media access control address of the first mobile station that is attempting to associate with the wireless local area network is known, and when the media access control address of the first mobile station is known, communicate with the first mobile station using the first unique pre-shared key previously pre-assigned to the first one of the geographical zones.

18. A non-transitory computer readable storage media encoded with instructions that, when executed by a processor, cause the processor to:
define geographical zones within a predetermined single geographical area that is serviced by a single service set identifier for a wireless local area network;
pre-assign, respectively, unique pre-shared keys to the geographical zones;
during a first on-boarding process of a first mobile station at a first one of the geographical zones, associate a media access control address of the first mobile station with a first unique pre-shared key previously pre-assigned to the first one of the geographical zones;

during a second on-boarding process of a second mobile station at a second one of the geographical zones, associating a media access control address of the second mobile station with a second unique pre-shared key previously pre-assigned to the second one of the geographical zones; and after completion of the first on-boarding process and the second on-boarding process, enable access of both the first mobile station and the second mobile station to a common user area of the wireless local area network within the predetermined single geographical area that is serviced by the single service set identifier using, for the first mobile station, the first the unique pre-shared key previously pre-assigned to the first one of the geographical zones and using, for the second mobile station, the second unique pre-shared key previously pre-assigned to the second one of the geographical zones, wherein the access is enabled based on the media access control address of the first mobile station, based on the media access control address of the second mobile station, and based on predetermined policies.

19. The non-transitory computer readable storage media of claim 18, encoded with instructions that, when executed by the processor, cause the processor to respectively associate access points for the wireless local area network to individual ones of the geographical zones.

20. The non-transitory computer readable storage media of claim 19, encoded with instructions that, when executed by the processor, cause the processor to supply the first unique pre-shared key previously pre-assigned to the first one of the geographical zones or a pre-shared key index value corresponding to the first unique pre-shared key previously pre-assigned to the first one of the geographical zones to the first mobile station via an application executing on the first mobile station.

\* \* \* \* \*